United States Patent
Matsuo et al.

(10) Patent No.: US 7,123,754 B2
(45) Date of Patent: Oct. 17, 2006

(54) FACE DETECTION DEVICE, FACE POSE DETECTION DEVICE, PARTIAL IMAGE EXTRACTION DEVICE, AND METHODS FOR SAID DEVICES

(75) Inventors: Hideaki Matsuo, Fukuoka (JP); Kazuyuki Imagawa, Fukuoka (JP); Yuji Takata, Yokohama (JP); Katsuhiro Iwasa, Iizuka (JP); Toshirou Eshima, Kitakyusyu (JP); Naruatsu Baba, Iizuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 719 days.

(21) Appl. No.: 10/154,404

(22) Filed: May 22, 2002

(65) Prior Publication Data

US 2002/0191818 A1 Dec. 19, 2002

(30) Foreign Application Priority Data

May 22, 2001 (JP) ............................. 2001-151828

(51) Int. Cl.
*G06K 9/00* (2006.01)

(52) U.S. Cl. ................................... 382/118
(58) Field of Classification Search ........ 382/115–127, 382/199
See application file for complete search history.

(56) References Cited

U.S. PATENT DOCUMENTS

| | | | | |
|---|---|---|---|---|
| 5,012,522 A | * | 4/1991 | Lambert | 382/118 |
| 5,164,992 A | * | 11/1992 | Turk et al. | 382/118 |
| 5,497,430 A | * | 3/1996 | Sadovnik et al. | 382/156 |
| 5,881,171 A | * | 3/1999 | Kinjo | 382/199 |
| 5,905,807 A | * | 5/1999 | Kado et al. | 382/118 |
| 6,115,495 A | * | 9/2000 | Tachikawa et al. | 382/165 |
| 6,188,777 B1 | * | 2/2001 | Darrell et al. | 382/103 |
| 6,297,846 B1 | | 10/2001 | Edanami | |
| 6,526,161 B1 | * | 2/2003 | Yan | 382/118 |
| 6,611,613 B1 | * | 8/2003 | Kang et al. | 382/118 |
| 6,741,756 B1 | * | 5/2004 | Toyama et al. | 382/291 |
| 6,804,391 B1 | * | 10/2004 | Blake et al. | 382/159 |
| 6,863,609 B1 | * | 3/2005 | Okuda et al. | 463/36 |
| 6,885,760 B1 | * | 4/2005 | Yamada et al. | 382/118 |

FOREIGN PATENT DOCUMENTS

| | | |
|---|---|---|
| JP | 6-208622 A | 7/1994 |
| JP | 7-23012 A | 1/1995 |
| JP | 8-63597 A | 3/1996 |
| JP | 8-153187 A | 6/1996 |

(Continued)

OTHER PUBLICATIONS

Samal A et al: "Human Face Detection using Silhouettes"; International Journal of Pattern Recognition and Artificial Intelligence, Singapore, XX, vol. 9, No. 6, Dec. 1, 1995, pp. 845-867.

(Continued)

*Primary Examiner*—Joseph Mancuso
*Assistant Examiner*—Hadi Akhavannik
(74) *Attorney, Agent, or Firm*—Darby & Darby

(57) ABSTRACT

A face detection device includes a face learning dictionary, which holds learned information for identification between a facial image and a non-facial image. An image input unit inputs a subject image. An edge image extraction unit extracts an edge image from the subject image. A partial image extraction unit, based on the edge image, extracts partial images that are candidates to contain facial images from the subject image. A face/non-face identification unit references the learning dictionary to identify whether or not each extracted partial image contains a facial image. Face detection of high precision, which reflects learned results, is performed.

23 Claims, 6 Drawing Sheets

FOREIGN PATENT DOCUMENTS

| JP | 09-73544 | 3/1997 |
|---|---|---|
| JP | HEI-10-307923 | 11/1998 |
| WO | WO-00/55811 A1 | 9/2000 |

OTHER PUBLICATIONS

Govindaraju V et al: "Verification of Faces in Cluttered Photographs"; Systems, Man, and Cybernetics, 1997. Computational Cybernetics and Simulation., 1997 IEEE International Conference on Orlando, FL., USA Oct. 12-15, 1997, New York, NY, IEEE, US, Oct. 12, 1997, pp. 2028-2033.

Govindaraju V: "Locating Human Faces in Photographs"; International Journal of Computer Vision, Kluwer Academic Publishers, Norwell, US, vol. 19, No. 2, Aug. 1, 1996, pp. 129-146.

(Juyang) Weng J et al: "Learning Recognition and Segmenation Using the Cresceptron"; International Journal of Computer Vision, Kluwer Academic Publishers, Norwell, US, vol. 25, No. 2, Nov. 1, 1997, pp. 109-143.

Maio D et al: "Real-Time Face Location on Gray-Scale Static Images"; Pattern Recognition, Pergamon Press Inc., Elmsford, NY, US, vol. 33, No. 9, Sep. 2000, pp. 1525-1539.

"Wide-Range, Person- and Illumination-insensitive Head Orientation Estimation", Ying Wu and Kentaro Toyama, proceedings of the Fourth IEEE International Conference on Automatic Face and Gesture Recognition 2000, Mar. 26-30, 2000.

"Pose Invariant Face Recognition", Fu Jie Huang, Zhihua Zhou, Hong-Jiang Zhang and Tsuhan Chen, proceedings of the Fourth IEEE International Conference on Automatic Face and Gesture Recognition 2000, pp. 245-250, Mar. 26-30, 2000.

"Face Detection and Pose Alignment Using Colour, Shape and Texture Information", Lixin Fan and Kah Kay Sung, proceedings of the Third IEEE International Workshop on Visual Surveillance (VS'2000), pp. Jul. 1-7, 2000.

"Multi-View Face Detection and Pose Estimation Using A Composite Support Vector Machine across the View Sphere", Jeffrey Ng and Shaogang Gong, proceedings of the International Workshop on Recognition, Analysis, and Tracking of Faces and Gesture in Real-Time Systems, Sep. 26-27, 1999.

"Face Recognition by Support Vector Machines", Guodong Guo, Stan Z. Li and Kapluk Chan, proceedings of the Fourth IEEE International Conference on Automatic Face and Gesture Recognition 2000, Mar. 26-30, 2000.

English language abstract of JP HEI-10-307923 to Makihito et al.

* cited by examiner

FACE DETECTION DEVICE, FACE POSE DETECTION DEVICE, PARTIAL IMAGE EXTRACTION DEVICE, AND METHODS FOR SAID DEVICES

FIELD OF THE INVENTION

This invention concerns a face detection device, face pose detection device, and arts related to these devices.

DESCRIPTION OF THE RELATED ART

In image processing fields where an image of a person is handled, it is convenient to have a system that can automatically detect the position and the approximate size of the face of the person in the image. Thus in recent years, attempts have been started toward carrying out face detection from a subject image and examining the face pose.

Reference 1 (Unexamined Japanese Patent Publication No. Hei-9-73544) discloses an art in which the face region is approximated by an ellipse. That is, with this art, the center coordinates, radii, ratio of the major axis and minor axis, and the angle formed by the major axis and the X axis of an ellipse, with which a face region is approximated, are used as parameters. These parameters are changed successively to search for optimal values.

With the art of Reference 2 (Unexamined Japanese Patent Publication No. Hei-10-307923), face parts, such as the eyes, nose, mouth, etc., are searched for successively in the subject image to detect the position of the face. Also, the face pose is detected based on the projection data of the face parts.

OBJECTS AND SUMMARY OF THE INVENTION

Even if the arts disclosed in these reference materials are gathered together, the following problems exist.
(Problem 1) In many cases, an object that is not a face, such as a shoulder, clothing, etc., is detected erroneously as a face.
(Problem 2) Since the entirety of the subject image is searched, the amount of processing is large and the time required is proportionately long.
(Problem 3) Although the detection of previously defined face poses, such as the front, right side, etc., can be detected, face poses that are intermediate to those of previously defined face poses, such as a pose at an oblique 45-degree direction, cannot be detected at all.
(Problem 4) Particularly in the case where face parts are detected successively as in Reference 2, the face pose becomes unknown even when only a part of the face parts cannot be detected.

OBJECTS AND SUMMARY OF THE INVENTION

In view of the above, an object of this invention is to provide a face detection device, face pose detection device, and art related to these devices that are high in the precision of detection.

A face detection device according to a first aspect of this invention includes a face learning dictionary, which holds learned information for identification between a facial image and a non-facial image, an image input unit, which inputs a subject image, an edge image extraction unit, which extracts an edge image from the subject image, an image extraction unit, based on the edge image, which extracts partial images that are candidates which may contain facial images from the subject image, and a face/non-face identification unit, which references the learning dictionary and identifies whether or not each extracted partial image contains a facial image.

With this arrangement, since the face/non-face identification unit references the learned information in an adequately taught face learning dictionary to identify whether or not a partial image contains a facial image, the possibility of erroneous detection is low and a face can be detected accurately.

Since not all of the subject image is examined but only partial images extracted by the image extraction unit are examined, the processing amount is low and the process can be completed in a short time in comparison to the prior art.

With a face detection device of a second aspect of this invention, the image input unit inputs a subject image comprising a moving image and the edge image extraction unit extracts an edge image by time subtraction of frames of the moving image. By this arrangement, an edge image can be extracted efficiently from a moving image.

With a face detection device of a third aspect of this invention, the image input unit inputs a subject image comprising a still image. The edge image extraction unit extracts an edge image by applying a differential filter to the still image. By this arrangement, an edge image can be extracted efficiently from a still image.

With a face detection device of a fourth aspect of this invention, the partial image extraction unit determines a contour that joins upper end parts of the edge image and extracts partial images from the subject image based on peaks and valleys of this contour. With this arrangement, partial images can be extracted in a rational manner since a facial image normally exists in a region between a peak and valley of the contour.

With a face detection device of a fifth aspect of this invention, the face learning dictionary contains both learned information based on facial images and learned information based on non-facial images. By this arrangement, the face/non-face identification unit can obtain grounds for positively recognizing that an image is not a facial image by the learned information based on non-facial images, thereby improving the reliability of the identification results.

With a face detection device of a sixth aspect of this invention, the face/non-face identification unit calculates a predefined evaluation function value and identifies between a face and a non-face based on this evaluation function value. By this arrangement, the face/non-face identification unit can identify between a face and non-face objectively based on the evaluation function value.

With a face detection device of a seventh aspect of this invention, a characteristic vector, having luminance information on a partial image as components, is used in the evaluation function. With this arrangement, by expressing the characteristics of the shape of an object that is captured in a partial image by a characteristic vector and evaluating this by the evaluation function, erroneous identification can be suppressed further.

With a face detection device of an eighth aspect of this invention, a characteristic vector, having the angles of edge normal direction vectors, determined by applying Sobel filters to a partial image, as components, is used in the evaluation function.

With a face detection device of a ninth aspect of this invention, a characteristic vector, having a histogram of the angles of edge normal direction vectors, determined by applying Sobel filters to a partial image, as components, is used in the evaluation function.

By these arrangements, when a plurality of partial images exist, stable face detection can be realized for all of the partial images.

When luminance values are used as components of the characteristic vector, the characteristic vector components are affected when the overall brightness of the image changes. However, when the angles of the edge normal direction vectors are used as components of the characteristic vector, since these angles themselves do not change even when the overall brightness of the image changes, face detection that is robust with respect to brightness can be performed.

A face pose detection device of a tenth aspect of this invention includes a face learning dictionary, which holds learned information for identification between a facial image and a non-facial image, an image input unit, which inputs a subject image, an edge image extraction unit, which extracts an edge image from the subject image, an image extraction unit, based on the edge image, which extracts partial images that are considered to contain facial images from the subject image, a face pose learning dictionary, which holds learned information on a plurality of predefined face poses according to each face pose, an evaluation function value calculation unit, which calculates evaluation function values for all predefined face poses based on the learned information on the face poses and on the extracted partial images, and a face pose calculation unit, based on the plurality of evaluation function values that have been calculated, which determines the face pose, including a face pose that is intermediate among the predefined face poses. With this arrangement, by determining the face pose based on a plurality of evaluation function values, the face pose calculation unit can detect not only a previously defined face pose, such as the front or the right side, but also a face pose that is intermediate among these predefined face poses, thereby enabling detailed face pose detection to be realized.

With a face pose detection device of an eleventh aspect of this invention, the plurality of predefined face poses are those of the four directions of front, back, right, and left. The face pose calculation unit determines the difference vector between the evaluation function values for the front and back orientations and the difference vector between the evaluation function values for the right and left orientations and determines the direction of the synthetic vector of these difference vectors as the face pose to be determined.

With this arrangement, by canceling out components that are 180 degrees opposite each other by means of the difference vectors and synthesizing the two difference vectors that intersect orthogonally at 90 degrees to obtain a synthetic vector, the face pose can be detected from the direction of the synthetic vector. This face pose includes not only previously defined poses, such as the front, right side, etc., but includes poses of all directions in 360 degrees. More detailed detection of the face pose can thus be achieved using only simple vector operations.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 2($b$) is an exemplary diagram of an edge image of the subject.

FIG. 2($c$) is an exemplary diagram of a contour of the subject.

FIG. 2($d$) is an exemplary diagram of a contour of the subject.

FIG. 6($b$) is an exemplary diagram of the left sample image of the subject.

FIG. 6($c$) is an exemplary diagram of the back sample image of the subject.

FIG. 6($d$) is an exemplary diagram of the right sample image of the subject.

DETAILED DESCRIPTION OF THE PREFERRED EMBODIMENTS

Figure 1:
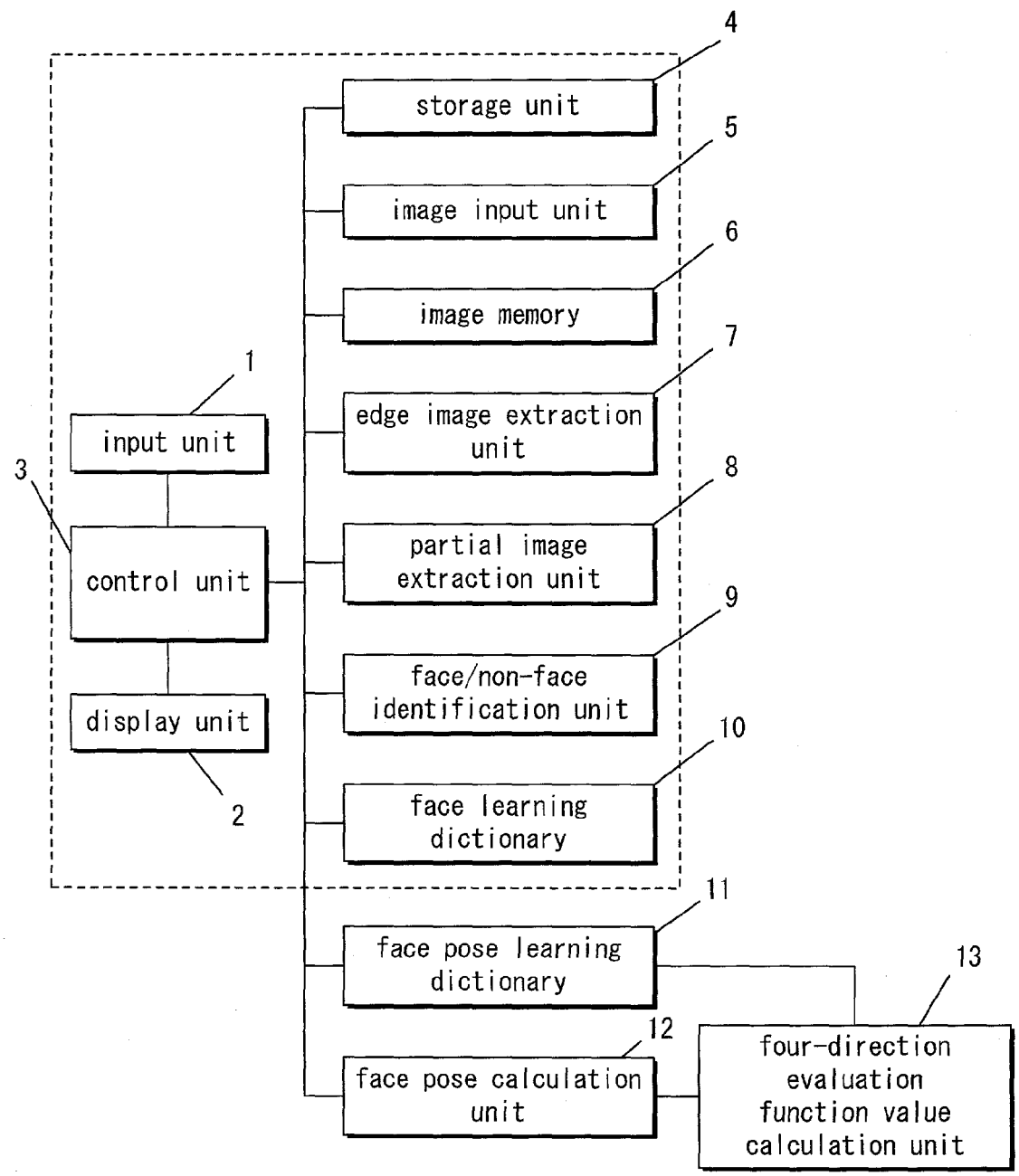
FIG. 1 is a block diagram of a face pose detection device of an embodiment of this invention.
Figure 2A:
FIG. 2($a$) is an exemplary diagram of a subject image.
Figure 2B:
Figure 2C:
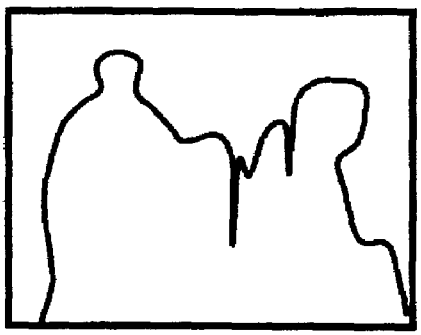
Figure 2D:
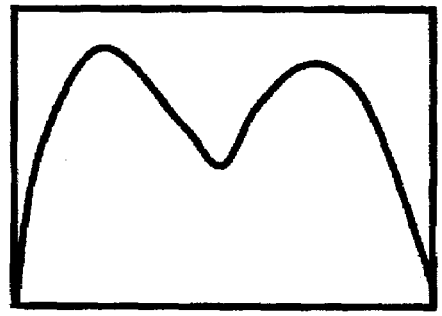

Referring to FIG. 1, a face pose detection device according to an embodiment of this invention, with the part inside the broken lines corresponding to the face detection device of this embodiment.

An input unit 1 includes a keyboard or mouse, etc., which an operator uses to input operation information concerning the device and to input the necessary information for preparing the two dictionaries to be described below.

A display unit 2 includes a CRT or LCD, etc. to display the subject image, processing conditions, detection results, etc. to the operator.

A control unit 3 controls the various elements shown in FIG. 1.

A storage unit 4 includes a hard disk device, etc. to store the subject image, detection results, etc.

An image input unit 5 includes a camera (for example, a CCD camera or CMOS camera) or an image scanner, etc. to input a moving image or a still image. With a moving image, the image of a selected frame becomes the subject image. With a still image, the still image itself becomes the subject image.

An image memory 6 stores the current subject image.

An edge image extraction unit 7 extracts an edge image from the subject image. When image input unit 5 inputs a moving image, edge image extraction unit 7 performs time subtraction between the image (subject image) of a noted frame and a frame image that is n frames prior (n can be selected as suited) and uses the difference image as the edge image.

When image input unit 5 inputs a still image, edge image extraction unit 7 applies a differential filter on the input still image to extract the edge image. The differential filter may be a conventional differential filter that is commonly used for contour extraction.

A partial image extraction unit 8 determines a frame for each partial image, which is a candidate to contain a facial image (for which there is a possibility that a facial image is contained) based on the edge image extracted by edge image extraction unit 7 (an edge image is handled in the same manner regardless of whether it is extracted from a moving image or from a still image).

As is described in detail below, this frame is determined based on peaks and valleys of a contour that joins upper end parts (the uppermost pixels in the Y direction) of the edge image.

Figure 3:
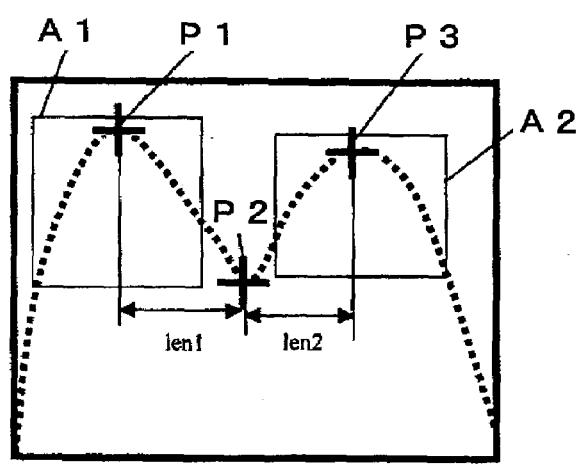
FIG. 3 is an exemplary diagram of the frames for partial images of the subject.

Referring now to FIG. 2(*a*) through FIG. 3, let the subject image be that which is shown in FIG. 2(*a*). Two men are captured in the image of FIG. 2(*a*). The man at the left side stands facing toward a left, frontal direction. The man at the right side is walking while facing toward the left.

Edge image extraction unit 7 extracts the edge image shown in FIG. 2(*b*) from the subject image of FIG. 2(*a*).

Partial image extraction unit 8 applies a spatial low-pass filter to the edge image of FIG. 2(*b*) to eliminate the fine noise, performs a search in the x direction on the image after application of the low-pass filter to plot the points, (x, max(x)), and to determine the contour. A contour with peaks and valleys, such as shown in FIG. 2(*c*), is thus obtained.

Partial image extraction unit 8 applies a low-pass filter to the contour of FIG. 2(*c*) to obtain the contour of FIG. 2(*d*). This process is performed since high frequency components (not shown) that are unnecessary are superimposed in the contour of FIG. 2(*c*). Such high frequency components are eliminated to obtain a general contour.

As a result, two large peaks with one valley therebetween appear as shown in FIG. 2(*d*). Since the coordinates of such peaks and valleys are simply maxima and minima, they can be determined simply by differentiating the contour.

Partial image extraction unit 8 thus determines the xy coordinates of peaks P1 and P3 and valley P2 as shown in FIG. 3 and determines the x-direction distance len1 between peak P1 and valley P2 and the x-direction distance len2 between valley P2 and peak P3.

Partial image extraction unit 8 then multiplies these distances len1 and len2 by suitable factors to determine the positions and sizes of frames A1 and A2. Partial image extraction unit 8 extracts the rectangular images positioned within these frames A1 and A2 as partial images (two in the present case).

As is clear from FIG. 3, since in contrast to the prior art (with which the entire subject image was subject to processing), only the frames A1 and A2 are subject to processing with the present invention, the amount of subject data to be processed is reduced significantly.

Partial image extraction unit 8 extracts partial images (which may be just one image or a plurality of images) from the subject image by the procedures described above. The above is just an example and the procedures may be changed suitably, such as dividing the subject image into blocks and extracting only the applicable blocks, etc.

Also, in FIG. 1, a face learning dictionary 10 holds learned information for recognizing between a facial image and a non-facial image. This learned information includes both information based on facial images and information based on non-facial images.

Face/non-face identification unit 9 references face learning dictionary 10 to identify whether or not an extracted partial image contains a facial image based on a predefined evaluation function value.

The face learning dictionary and the face/non-face identification process is now described in detail Face Learning Dictionary Face learning dictionary 10 is prepared prior to face detection. For preparing face learning dictionary 10, an adequate number of sample images Fi are prepared.

Here, let there be N sample images Fi ($1 \leq i \leq N$). These sample images include not only facial images but also non-facial images. The sample images generally have no relevance to the subject image and may be completely different images.

Also with the present embodiment, in order to facilitate the comparison of the data of face learning dictionary 10 and the data of the partial image, the images are normalized to 10×10 pixels (100 dimensions; this dimension value is only an example and may be changed as suited) size.

Here, normalized means that if the original image data are of 10×10 pixels, the original data are used as they are while, if the original image data are not of 10×10 pixels, expansion or contraction is performed while maintaining the vertical to horizontal ratio to change the size to provide data of 10×10 pixels.

With the present embodiment, a single characteristic vector Si ($1 \leq i \leq N$) is set for each image. With this embodiment, the luminance values of the respective pixels are used as the respective components of this characteristic vector Si. A characteristic vector Si of this embodiment is thus a 100-dimensional vector.

Although the luminance values here are preferably of approximately 8 bits, in extreme cases, binary values of black and white may be used as well. If color images are premised, hue or saturation, etc. may be used instead of luminance values.

For the respective sample images Fi, which include facial images and non-facial images, teacher data Yi ($1 \leq i \leq N$) are set with the human eye. The teacher data Yi are such that i=+1 when a sample image is a facial image and i=−1 when a sample image is a non-facial image.

Lagrange coefficients αi are determined for each sample image Fi

The Lagrange coefficients αi are used in Support Vector Machines. Support Vector Machines are pattern identification machines proposed by Cortes and Vapnik in 1995. These machines project an input vector onto a higher-order characteristic space by a nonlinear projection and construct an identification hyperplane for which the generalization performance is maximized as the solution of a mathematical programming problem Support Vector Machines are described in detail in "The Institute of Electronics, Information, and Communication Engineers, Technical Report of IEICE PRMU98-36", *Identification of Multiple Categories by Support Vector Machines*, Shimodaira, et al. This reference material is incorporated herein by reference and should be referred to for details.

The parameters, etc. that are used in the present invention are now described. A support vector refers to a characteristic vector Si on the optimal identification hyperplane. The following holds for a support vector:

$$w = \Sigma Yi \times \alpha i \times Si$$

In the following, an inner product of vectors is indicated by the operator, "·".

In the above, w is a margin parameter between two identification hyperplanes $$(w \cdot S - b - 1 = 0 \text{ and } w \cdot S - b + 1 = 0)$$

The magnitude of the margin is $2/\sqrt{(w \cdot w)}$. b is an offset value. From the mathematical relationship, αi and b are determined uniquely when w is defined.

The above-described characteristic vector Si, teacher data Yi, and Lagrange coefficients αi are stored for each single image in face learning dictionary 10. The offset value b is also stored. The preparation of face learning dictionary 10 is thereby completed.

Face/Non-Face Identification

The face/non-face identification process in face/non-face identification unit 9 is now described. To perform this identification, the above-described face learning dictionary 10 must be completed and the partial images must be normalized in the same manner as the above-described sample images.

A characteristic vector X is then determined in the same manner as was determined for the sample images for each partial image. The luminance values of the respective pixels are used as the respective components of the characteristic vector X. Thus, the characteristic vector X of this embodiment is a 100-dimensional vector.

An evaluation function g(X) is then defined by the following equation:

$$g(X) = \Sigma \alpha i \times Yi \times K(Si, X) \times b$$

In the above, K(Si, X) is a kernel function. Also, an image is judged to be a face if g(X)>0 and an image is judged to be not a face when g(X)≦0.

In the case where the above-described Support Vector Machines are used, $$K(Si, X) = \exp(-\|Si-X\|^2/2\sigma^2)$$

is preferably used as the kernel function K(Si, X). When Support Vector Machines are thus used, their generalization performance can be increased and the stability of detection of a facial image can be improved by maximizing the margin.

Besides the above, the kernel function may be defined using a polynomial as follows:

$$K(Si, X) = (Si \cdot X + 1)n$$

or is defined using a two-layer neural network as follows:

$$K(Si, X) = \tanh(Si \cdot X - \delta)$$

Figure 4:
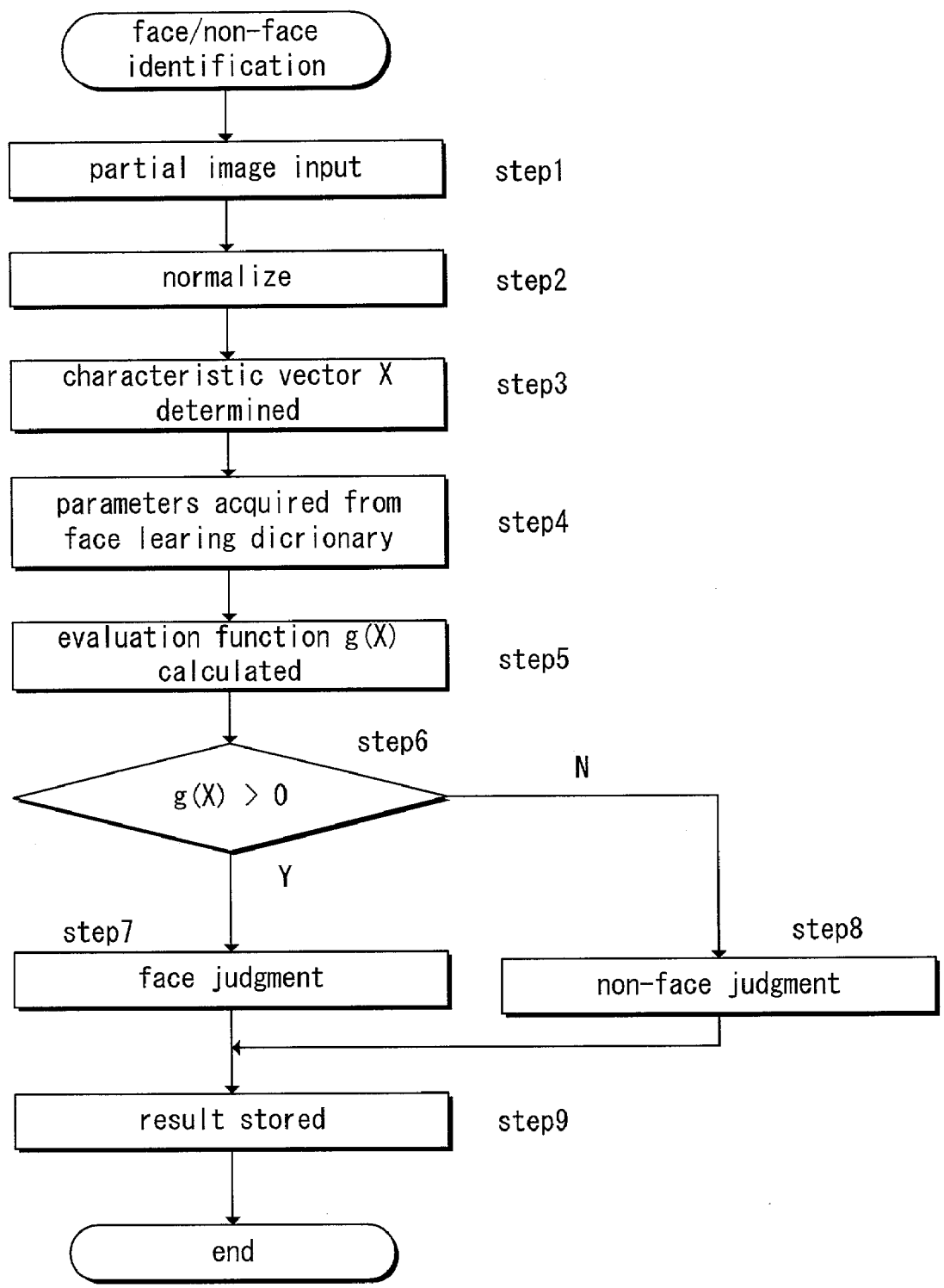
FIG. 4 is a flowchart of the face/non-face identification process of the subject.
Figure 5:
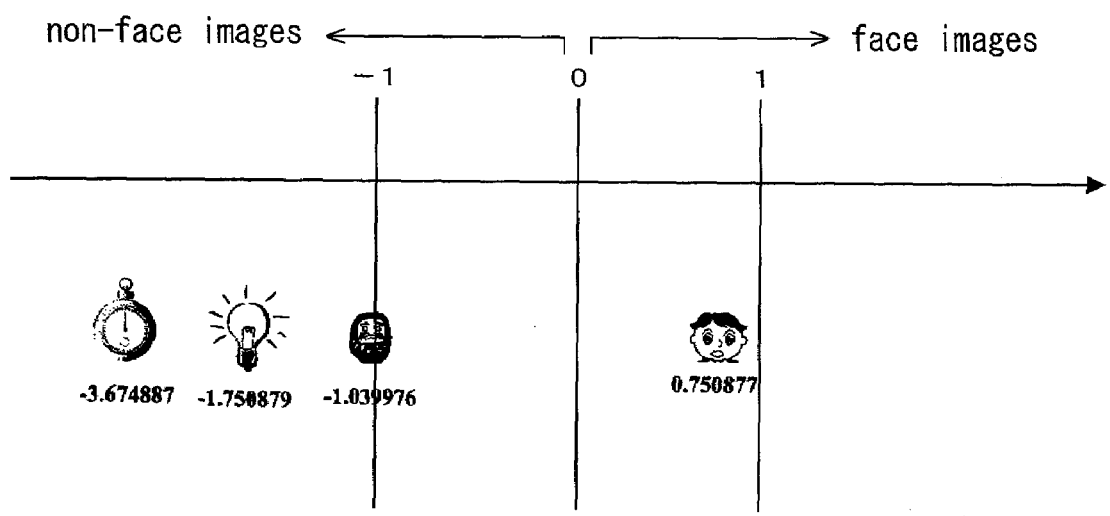
FIG. 5 is an exemplary diagram of the evaluation function value of the subject.

Referring now to FIGS. 4 and 5, the flow of the process of face/non-face identification unit 9 and examples of the processing results are now described.

In step 1, face/non-face identification unit 9 inputs a partial image from partial image extraction unit 8. Face/non-face identification unit 9 then normalizes this partial image into 10×10 pixels (step 2) and determines a characteristic vector X using the luminance values of the 10×10 pixels (step 3).

Face/non-face identification unit 9 then references face learning dictionary 10 to acquire the necessary parameters αi, Yi, and b (step 4) and calculates the kernel function K (Si, X). This is repeated and the sum of the products is determined to determine the evaluation function g(X) value (step 5).

When the evaluation function g(X) value has been determined, face/non-face identification unit 9 checks whether or not this value is positive (step 6). If the value is positive, face/non-face identification unit 9 judges that the subject image contains a facial image (step 7). If the value is not positive, face/non-face identification unit 9 judges that the subject image does not contain a facial image (step 8).

When the judgment has been completed, face/non-face identification unit 9 stores the evaluation function g(X) value and the judgment result in storage unit 4 (step 9).

FIG. 5 shows examples of the results of such a face/non-face identification process. For the image of the frontal view of a human being among the illustrated examples, the evaluation function g(X) value was 0.750877 and the judgment that a facial image is contained is made by the positive value.

Meanwhile, for a shape that is similar to a human face but is not a human face, the evaluation function g(X) value is negative and it is judged that a facial image is not contained.

A careful look at FIG. 5 shows that, as the absolute value of a negative value increases, the shape differs more and more from a human face.

With the present examples, the values are −1.039976 for a daruma (potbellied doll) figure, −1.750879 for a light bulb, and −3.674887 for a round clock. Although such a daruma figure, light bulb, and clock tend to be readily identified erroneously as being a face by the prior art, they are clearly and correctly identified as not being a face by this invention.

For the contents described above, the components of the characteristic vectors Si and X may be set to:

(Modification Example 1) "the angles of edge normal direction vectors, which were determined by applying Sobel filters to the partial image" or (Modification Example 2) "the histogram of the angles of edge normal direction vectors, which were determined by applying Sobel filters to the partial image"

A Sobel filter is defined for example as follows for the x direction:

$$\begin{bmatrix} -1 & 0 & 1 \\ -2 & 0 & 2 \\ -1 & 0 & 1 \end{bmatrix} \quad [\text{Eq. 1}]$$

and as follows for the y direction:

$$\begin{bmatrix} -1 & -2 & -1 \\ 0 & 0 & 0 \\ 1 & 2 & 1 \end{bmatrix} \quad [\text{Eq. 2}]$$

By applying these Sobel filters, a vector is determined that has the intensity in the x direction of each image and the intensity in the y direction of each image as the x and y components. Only the angle of the vector is used and the magnitude of the vector is ignored.

In (Modification Example 1), this angle is normalized using 256 gradations as the basis and used for characteristic vector Si or X.

In (Modification Example 2), the histogram of the results of normalizing the above angle using 256 gradations as the basis is used for characteristic vector Si or X.

The characteristic vector can thus be changed in the above manner. When luminance values are used as components of the characteristic vector, the characteristic vector components will be affected when the overall brightness of the image changes.

When the angles of the edge normal direction vectors are used as a component of the characteristic vector as described above, since these angles themselves will not change even when the overall brightness of the image changes, face detection that is robust with respect to brightness can be performed.

Next, the face pose detection device of the present embodiment is described. As shown in FIG. 1, the face pose detection device has, in addition to the above-described face detection device, a face pose learning dictionary 11, a face pose calculation unit 12, and a four-direction evaluation function value calculation unit 13.

Figure 6A:
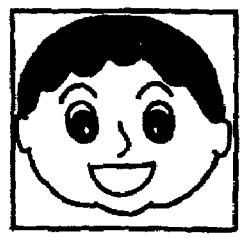
FIG. 6($a$) is an exemplary diagram of the front sample image of the subject.
Figure 6B:
Figure 6C:
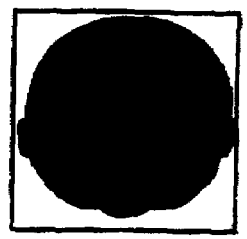
Figure 6D:
Figure 7:
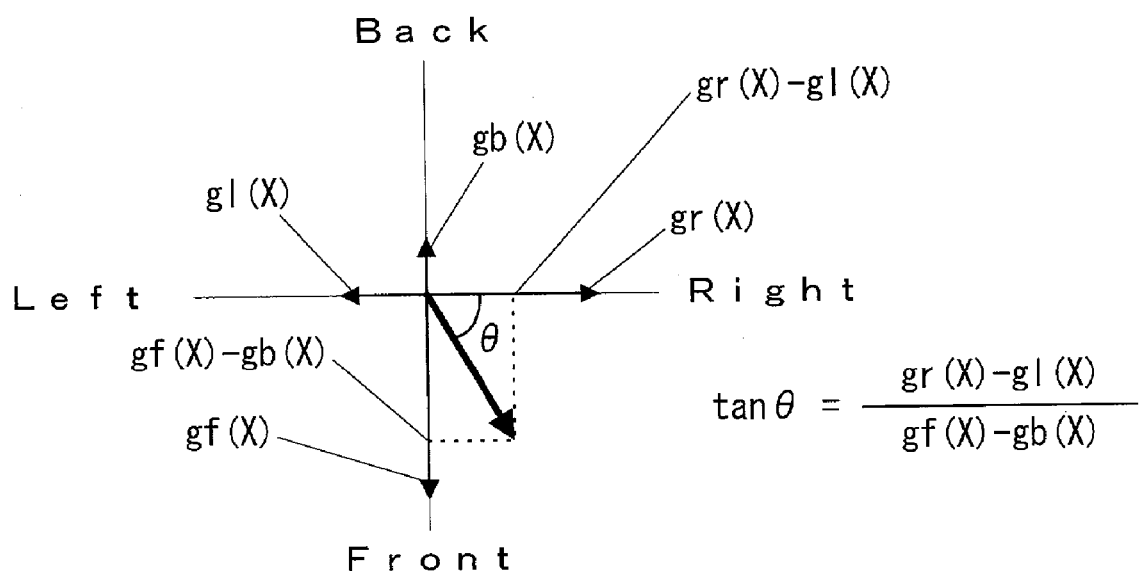
FIG. 7 is an explanatory diagram of the difference vectors and synthetic vector of the subject.

First, face pose learning dictionary 11 contains, for a plurality of predefined face poses (the face poses of the four directions of front, back, right, and left in the present embodiment), independently learned information according to each face pose. That is, four types of sample images (for the number of directions) are prepared separately as shown in FIGS. 6(a)–6)d) and four sets of learned information are prepared corresponding to the learned information in face learning dictionary 10.

To be more specific, for the frontal pose, learned information dedicated to the identification between a frontal facial image and non-frontal facial image are prepared. Dedicated learned information are likewise prepared for the backward pose, rightward pose, and leftward pose.

Four-direction evaluation function value calculation unit 13 independently references the subject image extracted by partial image extraction unit 8 and the learned information for each of the four directions independently and determines, in the same manner as was carried out by face/non-face identification unit 9, four evaluation function g(X) values (here, the evaluation function g(x) value for the frontal pose shall be referred to as "gf(X)" that for the backward pose shall be referred to as "gb(X)" that for the rightward pose shall be referred to as "gr(X)" and that for the leftward pose shall be referred to as "gl(X)".

When the four-direction evaluation function calculation unit 13 has determined the four evaluation function values, face pose calculation unit 12 calculates the two difference vectors:

$$dy(X)=gf(X)-b(X) \text{ and}$$

$$dx(X)=gr(X)-gl(X)$$

that cancel out components that oppose each other by 180 degrees.

Components of directions that are low in evaluation function values (that is, components that do not provide confidence with regard to the face pose) are thus eliminated.

Face pose calculation unit 12 then determines the direction of the synthetic vector (dx(X), dy(X)), having the abovementioned difference vectors as the x and y components, as the face pose. This pose may take on that of any direction in 360 degrees. In this manner, the face pose is thus determined with high precision.

Figure 8:
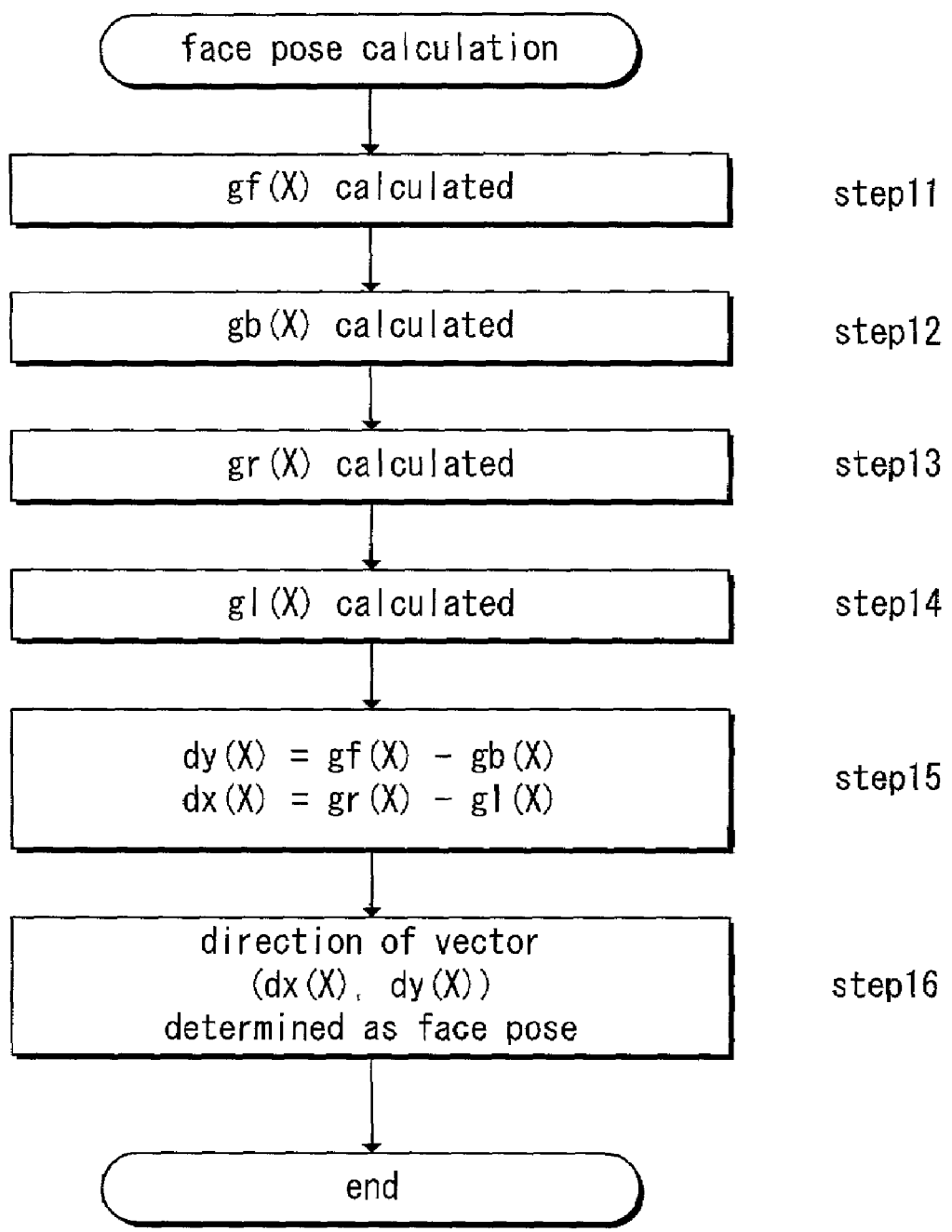
FIG. 8 is a flowchart of the face pose calculation by the subject.

The flow of face pose calculation by the present embodiment shall now be described using FIG. 8. First, the preparation of face pose learning dictionary 11 is completed and then face pose calculation unit 12 acquires a partial image from edge image extraction unit 7.

In step 11, face pose calculation unit 12 hands over the partial image to four-direction evaluation function value calculation unit 13. Four-direction evaluation function value calculation unit 13 determines the four evaluation function values (gf(X), gb(X), gr(X), gl(X)) and returns these values to face pose calculation unit 12 (steps 11 through 14). The order of operation maybe changed arbitrarily.

Face pose calculation unit 12 then determines the difference vectors dx(X) and dy(X) in step 15 and stores the direction of the synthetic vector (dx(X), dy(X)) as the face pose in storage unit 4 in step 16.

Although these evaluation function values are used as the evaluation function values in the present embodiment, correlation coefficients, etc. that are generally used may be used instead.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A face detection device comprising:
a face learning dictionary for holding learned information for identification between a facial image and a non-facial image;
an image input unit operable to input a subject image;
an edge image extraction unit operable to extract an edge image from said subject image;
a partial image extraction unit operable to extract, based on said edge image, partial images that are candidates to contain facial images from said subject image;
a face/non-face identification unit operable to reference said learning dictionary and identifies whether or not each extracted partial image contains a facial image,
wherein the partial image extraction unit is configured to determine a contour that joins upper end parts of the edge image and further configured to extract partial images from the subject image based on peaks and valleys of the contour.

2. The face detection device as set forth in claim 1, wherein:
said image input unit inputs a subject image comprising a moving image; and
said edge image extraction unit extracts an edge image by time subtraction of frames of said moving image.

3. The face detection device as set forth in claim 1, wherein:
said image input unit inputs a subject image comprising a still image; and
said edge image extraction unit extracts an edge image by applying a differential filter to said still image.

4. The face detection device as set forth in claim 1, wherein said face learning dictionary contains both learned information based on facial images and learned information based on non-facial images.

5. The face detection device as set forth in claim 1, wherein said face/non-face identification unit calculates a predefined evaluation function value and identifies between a face and a non-face based on said evaluation function value.

6. The face detection device as set forth in claim 5, wherein a characteristic vector, having luminance information on a partial image as components, is used in said evaluation function.

7. The face detection device as set forth in claim 5, wherein a characteristic vector, having angles of edge normal direction vectors, which were derived from a partial image, as components, is used in said evaluation function.

8. The face detection device as set forth in claim 5, wherein a characteristic vector is expressed by a histogram, which was derived from a partial image.

9. A face pose detection device comprising:
a face learning dictionary, which holds learned information for identification between a facial image and a non-facial image;
an image input unit operable to input a subject image;
an edge image extraction unit operable to extract an edge image from said subject image;
a partial image extraction unit operable to extract, based on said edge image, partial images that are candidates to contain facial images from said subject image;
a face pose learning dictionary, which holds learned information on a plurality of predefined face poses according to each face pose;
an evaluation function value calculation unit operable to calculate evaluation function values for all predefined face poses based on said learned information on said face poses and said extracted partial images; and
a face pose calculation unit operable to determine said face pose based on said plurality of evaluation function values that have been calculated, including a face pose that is intermediate among said predefined face poses,
wherein the partial image extraction unit is configured to determine a contour that joins upper end parts of the edge image and further configured to extract partial images from the subject image based on peaks and valleys of the contour.

10. The face pose detection device as set forth in claim 9, wherein said predefined plurality of face poses are said face poses of four directions of front, back, right, and left and said face pose calculation unit determines a direction of a synthetic vector of said evaluation function values for these four directions as said face pose to be determined.

11. A partial image extraction device comprising:
an image input unit operable to input a subject image;
an edge image extraction unit operable to extract an edge image from said subject image;
a partial image extraction operable to extract, based on said edge image, partial images that are considered to contain facial images from said subject image; and
said partial image extraction unit is configured to determine a contour that joins upper end parts of the edge image and further configured to extract partial images from said subject image based on peaks and valleys of the contour.

12. A face detection method comprising:
inputting a subject image;
extracting an edge image is extracted from said subject image;
based on said edge image, extracting partial images from said subject image that are candidates to contain facial images;
referencing a face learning dictionary that holds learned information for identification between a facial image and a non-facial image to determine whether or not each extracted partial image contains a facial image;
determining a contour that joins upper end parts of said edge image; and
extracting partial images from said subject image based on peaks and valleys of said contour.

13. The face detection method as set forth in claim 12, wherein said subject image is a moving image and extracting an edge image by time subtraction of frames of said moving image.

14. The face detection method as set forth in claim 12, wherein said subject image is a still image, and applying a differential filter to said still image to extract an edge image.

15. The face detection method as set forth in claim 12, wherein said face learning dictionary contains both learned information based on facial images and learned information based on non-facial images.

16. The face detection method as set forth in claim 12, further comprising:
calculating a predefined evaluation function value; and
evaluating said evaluation function value to determine identification between a face and a non-face.

17. The face detection method as set forth in claim 16, wherein a characteristic vector, having luminance information on a partial image as components, is used in said evaluation function.

18. The face detection method as set forth in claim 16, wherein a characteristic vector, having angles of edge normal direction vectors, which were derived from a partial image, as components, is used in the evaluation function.

19. The face detection method as set forth in claim 16, wherein a characteristic vector is expressed by a histogram, which was derived from a partial image.

20. A face pose detection method comprising the steps of:
inputting a subject image;
extracting an edge image from said subject image;
determining a contour that joins upper end parts of said edge image;
extracting partial images from said edge image that are candidates to contain facial images based on peaks and valleys of said contour;
calculating an evaluation function value, which includes referencing a face pose learning dictionary, which holds learned information on a plurality of predefined face poses according to each face pose;
the step of calculating includes calculating said evaluation function values for all predefined face poses based on said learned information on said face poses and said extracted partial images; and
calculating a face pose, based on said plurality of evaluation function values that have been calculated, said face pose, including determining a face pose that is intermediate among said predefined face poses.

21. The face pose detection method as set forth in claim 20, wherein said predefined plurality of face poses are face poses of the four directions of front, back, right, and left and determining a direction of a synthetic vector of the evaluation function values for these four directions as the determined face pose.

22. The face detection device as set forth in claim 1, wherein the partial image extraction unit is further configured to determine a first contour of said edge image, to filter said first contour to obtain a second contour having peaks and valleys, and to extract, based on said peaks and valleys, partial images that are candidates to contain facial images from said subject image.

23. The face detection method as set forth in claim 12, further comprising the steps of:
applying a filter to said edge image to determine a first contour having peaks and valleys;
applying a filter to said first contour to obtain a second contour having peaks and valleys; and
extracting partial images from said subject image based on said peaks and valleys of said second contour.

* * * * *